April 21, 1925.
H. E. HUSSEY
1,534,326
MOVING PICTURE PROJECTOR
Filed May 8, 1922
2 Sheets-Sheet 1
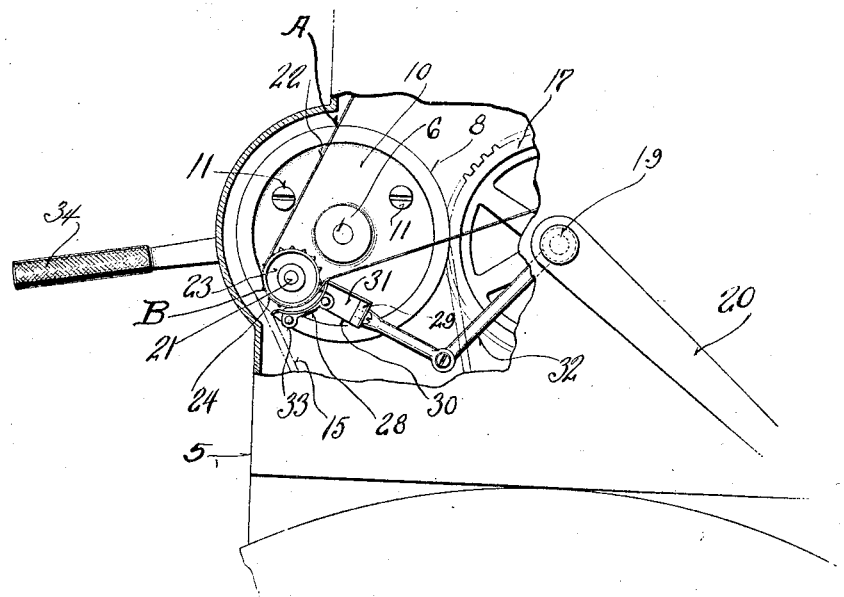
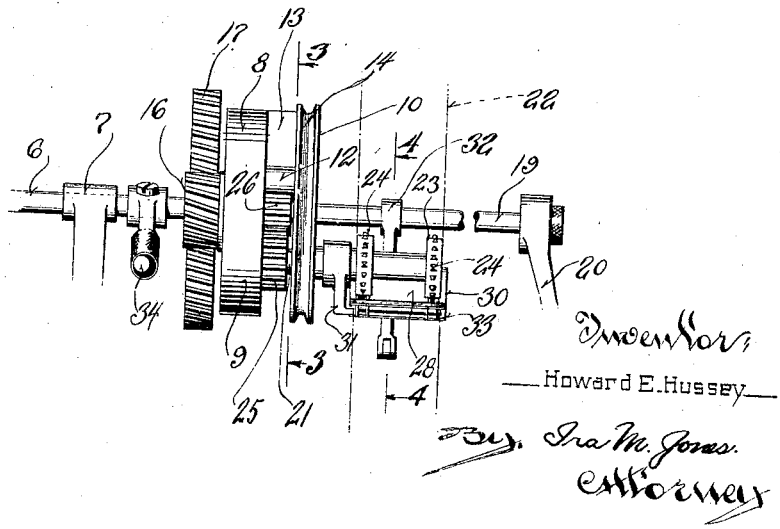

April 21, 1925.

H. E. HUSSEY 1,534,326

MOVING PICTURE PROJECTOR

Filed May 8, 1922

Inventor,

Howard E. Hussey

By Ira M. Jones.

Attorney

Patented Apr. 21, 1925.

1,534,326

UNITED STATES PATENT OFFICE.

HOWARD E. HUSSEY, OF MILWAUKEE, WISCONSIN, ASSIGNOR, BY DIRECT AND MESNE ASSIGNMENTS, TO ROTOGRAPH MOTION PICTURE MACHINE COMPANY, OF MILWAUKEE, WISCONSIN, A CORPORATION OF WISCONSIN.

MOVING-PICTURE PROJECTOR.

Application filed May 8, 1922. Serial No. 559,300.

*To all whom it may concern:*

Be it known that I, HOWARD E. HUSSEY, a citizen of the United States, and resident of Milwaukee, in the county of Milwaukee and State of Wisconsin, have invented new and useful Improvements in Moving-Picture Projectors, of which the following is a description, reference being had to the accompanying drawings, which are a part of this specification.

This invention relates to new and useful improvements in moving picture projectors and refers more particularly to that mechanism which advances the film, a picture at a time.

The most common method of advancing a moving film, a picture at a time, is by a Geneva intermittent movement, and while this construction performs the functions imparted thereto, still it is open to many objectionable features, i. e., it is expensive to construct, requires delicate and accurate machining and is a delicate mechanism necessitating a number of moving parts.
Having this in mind, it is one of the objects of my invention to provide an improved mechanism for advancing a film, a picture at a time, in which the conventional Geneva intermittent movement is displaced by a gear mechanism, thus materially simplifying the structure and assuring smooth and positive operation at all times.

Another object of this invention resides in the provision of a rotatably mounted drive member carrying a film feeding sprocket to one side of the axis thereof whereby rotation of the drive member will cause the sprocket to intermittently advance the film a picture at a time.
A further object of this invention resides in the provision of a machine of the character described in which the film engaging sprocket is continuously rotated about the axis of a drive member and which is continuously rotated about its own axis in the direction of rotation of the drive member to advance the film a picture at a time.

A still further object of this invention resides in the provision of a machine of the character described in which means are provided for properly aligning each film picture.

With the above and other objects in view which will appear as the description proceeds, my invention resides in the novel construction, combination, and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a part of a moving picture projector illustrating the application thereto of my invention, parts thereof being broken away and in section to more clearly illustrate structural details;

Figure 2 is a front view of my improved film feeding mechanism, the same being illustrated as detached from the projector housing;

Figure 3:
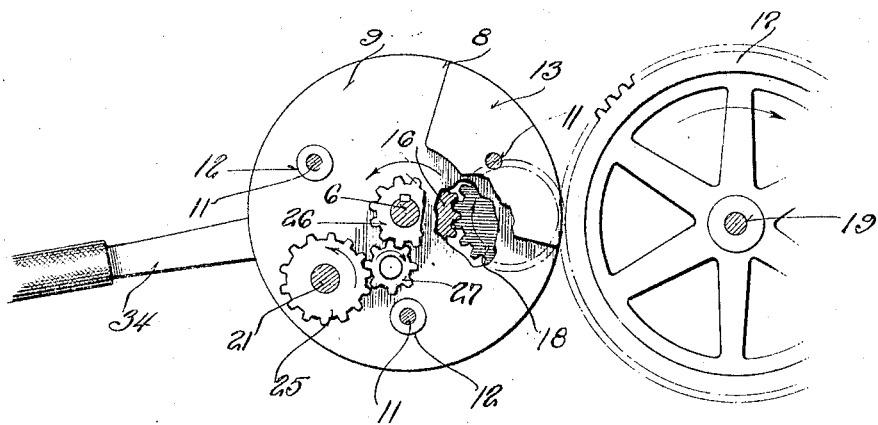
Figure 3 is a view part in section and part in elevation taken on the plane of line 3—3 of Figure 2, and Figure 4:
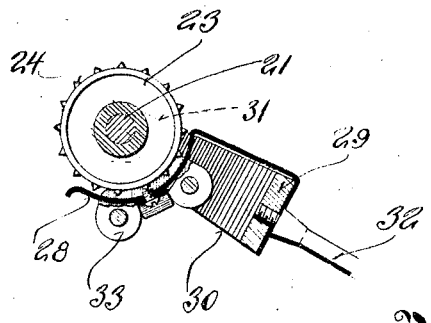
Figure 4 is a sectional view taken through Figure 2 on the plane of line 4—4 and illustrating the guide for maintaining the film in engagement with the drive sprocket.

Moving picture films are in a long strip provided with spaced openings along each peripheral edge for engagement with a suitable feeding sprocket and the intermediate portion of the film is divided into panels or individual pictures, the film being designed to be advanced, a picture at a time, at the average rate of sixteen or more pictures per second, one picture being aligned in the frame, which is in the path of the projecting rays, each time the film comes to rest.

Various devices have been employed for this intermittent feeding of the film, among the most common of which is the Geneva intermittent movement. However, objections are found to this movement more especially when viewed from a manufacturing standpoint and in the drawings I have illustrated an improved type of mechanism for properly advancing the film a picture at a time, in which the Geneva movement is eliminated and its place taken by a planetary gear movement.

In the drawings the numeral 5 designates the housing of a moving picture projector in which is mounted a shaft 6, said shaft being secured in suitable bearings 7, but one being illustrated in the drawings, and being normally stationary. Freely rotatably mounted on the outer end of shaft 6 is a drive member 8, constructed preferably in two parts 9 and 10, connected by securing bolts 11 and maintained in spaced relation by collars or spacing sleeves 12 and a counter-balance weight 13. Part 9 is preferably in the form of a fly wheel and part 10 has its periphery annually grooved as at 14 to provide a pulley around which the drive belt 15 of a drive motor (not shown) is trained, whereby the device may be electrically driven or else manually driven by the means to be later described.

Fixed to wheel 8, and also freely journaled on shaft 6, is a pinion gear 16 which is connected with a large gear wheel 17 by an intermediate idler gear 18, see Figure 3. Gear 17 is fixed to a shaft 19, one end of which projects outwardly of the projecting casing 5 to receive a drive handle 20 whereby the film feed may be readily manually operated if desired.

Journaled in the parts 9 and 10 forming the drive member 8 and offset with respect to the axis of shaft 6 is a shaft 21, the outer end of which intersects the path of the film 22, to be advanced through the projector, and has mounted thereon a feed sprocket 23 which may be of conventional type provided with teeth 24 for engagement in the peripheral apertures (not shown) of the film. Splined on that portion of shaft 21 positioned between parts 9 and 10 is a pinion gear 25 which is connected with a pinion gear 26 fixed to that portion of shaft 6 confined between parts 9 and 10 by an intermediate idler gear 27 whereby a planetary gear arrangement is provided to continuously revolve gear 25 and consequently sprocket 23 in the direction of rotation of the drive member 8 when said member is rotated either manually by handle 20 or mechanically by means of the drive motor (not shown).

The film 22 is fed through suitable mechanism from the reel of the projector down through the projecting frame, (not shown) thence around sprocket 23 and then to the take-up reel and as drive member 8 is rotated in a counter-clockwise direction with reference to Figure 1, sprocket wheel 23 draws or advances the film one picture during its movement from a point approximately located at "A" to approximately point "B." During this time sprocket 23 is also rotated about its own axis and as the sprocket is moved from point "B" around again to point "A," it is still continuously rotated on its own axis so that when it is again exerting a pull on the film, it will be moved the required amount.

The film is prevented from disengagement from the sprocket 23 by a guide 28 which is carried by the rear end 29 of a substantially right angular shaped yoke member 30, the end 31 of which is freely journaled about shaft 21 to permit its movement as the member 8 is rotated to insure the constant proper positioning of the guide. The movement of yoke 30 is controlled by a medially pivoted rod 32, one end of which is made fast to the yoke and the other end freely journaled on shaft 19. Guide 30 also has two auxiliary guides 33 positioned adjacent each set of teeth 24 and having a part positioned on each side of the teeth to insure the proper engagement of the same in the film apertures.

As oftentimes it is necessary to frame the pictures of the film, i. e., have the film so positioned when it comes to rest the picture to be projected by the machine will be properly positioned with respect to the projecting ray and I accomplish this by advancing or retarding shaft 6 through the medium of a framing lever 34, one end of which is made fast to shaft 6 and the other end extending outwardly of casing 5.

What I claim as my invention is:

1. In a machine of the character described, a revolvably mounted drive member, a film engaging member carried by the drive member and offset with respect to the axis thereof, means for rotating the drive member, means for rotating the film engaging member in the direction of rotation of the drive member, the film engaging member intermittently feeding a film engaged therewith, and means for advancing or retarding the rotation of the film engaging member a desired degree with respect to the drive member to regulate the positioning of the film fed thereby.

2. In a machine of the character described, a revolvably mounted drive member, a shaft journaled in the drive member to one side of its axis, a film feeding sprocket mounted on the shaft, means for maintaining the film to be fed in engagement with the sprocket, a fixed gear about which the drive member rotates, a planetary drive connection between said gear and the sprocket shaft, whereby the sprocket is rotated in the direction of rotation of the drive member, and means for advancing and retarding the fixed gear with respect to the drive member to regulate the positioning of the film fed by the sprocket.

3. In a machine of the character described, a normally stationary shaft, a drive member freely rotatably mounted thereon, a stub shaft rotatably carried by said drive member and offset with respect to the axis thereof, a film feeding sprocket fixed to said stub shaft, a gear fixed to the first named shaft, said gear being stationary with respect to the drive member, a planetary gearing connecting the stub shaft with the fixed gear, means for rotating the drive member on its shaft whereby the stub shaft travels around the axis of the drive member and rotates on its own axis, and means connected with the first named shaft for advancing or retarding said fixed gear, for the purposes described.

4. In a machine of the character described, a supporting frame, a pair of spaced parallel shafts journaled therein, a drive member freely rotatably mounted on one shaft, means carried by the other shaft and adapted to, upon rotation, rotate said drive member, a gear fixed to said drive member shaft independent of the drive member, a stub shaft rotatably carried by said drive member to one side of its axis, a planetary gearing connecting the stub shaft with the fixed gear, whereby rotation of the drive member rotates the stub shaft, film advancing means carried by the stub shaft, and means for advancing or retarding the stub shaft, for the purposes described.

5. In a machine of the character described, a rotatably mounted drive member, a film feeding sprocket carried thereby and offset with respect to the axis thereof, means for rotating the drive member, a guide for maintaining a film in engagement with the feeding sprocket, said guide moving about the axis of the drive member with the sprocket, and means for at all times maintaining the guide adjacent the lower portion of the sprocket.

6. In a machine of the character described, a rotatably mounted drive member, a film feeding sprocket carried thereby and offset with respect to the axis thereof, a pair of levers, means pivotally connecting the inner ends of said levers, means pivotally connecting the outer end of one lever with said drive member, means connecting the outer end of the other lever to a stationary pivot, and a film guide carried by the lever connected with the drive member to maintain the film being fed by said film feeding sprocket in engagement therewith.

In testimony whereof I affix my signature.

HOWARD E. HUSSEY.